United States Patent
Jounay et al.

(10) Patent No.: US 8,599,680 B2
(45) Date of Patent: Dec. 3, 2013

(54) VIRTUAL CIRCUIT CONFIGURATION METHOD

(75) Inventors: Frédéric Jounay, Pleumeur Bodou (FR); Jean-Louis Le Roux, Lannion (FR)

(73) Assignee: France Telecom, Paris (FR)

( * ) Notice: Subject to any disclaimer, the term of this patent is extended or adjusted under 35 U.S.C. 154(b) by 56 days.

(21) Appl. No.: 13/131,497

(22) PCT Filed: Nov. 25, 2009

(86) PCT No.: PCT/FR2009/052296
§ 371 (c)(1),
(2), (4) Date: Jun. 28, 2011

(87) PCT Pub. No.: WO2010/061133
PCT Pub. Date: Jun. 3, 2010

(65) Prior Publication Data
US 2011/0261824 A1    Oct. 27, 2011

(30) Foreign Application Priority Data
Nov. 28, 2008 (FR) ...................... 08 58113

(51) Int. Cl.
*G01R 31/00* (2006.01)
(52) U.S. Cl.
USPC ............ 370/216; 370/242; 370/254; 370/397
(58) Field of Classification Search
USPC ......... 370/216, 242, 228, 227, 252, 254, 348, 370/397–399, 395.53, 409
See application file for complete search history.

(56) References Cited

U.S. PATENT DOCUMENTS

| 5,119,369 A * | 6/1992 | Tanabe et al. ................. 370/392 |
| 6,665,263 B1 * | 12/2003 | Kawabata et al. ............ 370/219 |
| 2010/0008222 A1 | 1/2010 | Le Roux et al. |

FOREIGN PATENT DOCUMENTS

WO    2008037917 A1    4/2008

OTHER PUBLICATIONS

International Search Report dated Jul. 13, 2010 for corresponding International Application No. PCT/FR2009/052296, filed Nov. 25, 2009.
Written Opinion dated Jul. 13, 2010 for corresponding International Application No. PCT/FR2009/052296, filed Nov. 25, 2009.

(Continued)

*Primary Examiner* — Yemane Mesfin
*Assistant Examiner* — Mon Cheri Davenport
(74) *Attorney, Agent, or Firm* — Westman, Champlin & Koehler, P.A.; David D. Brush

(57) ABSTRACT

A method and apparatus are provided for configuring a virtual circuit set up between a first and a second terminal installation. The virtual circuit is carried by an underlying path including a first link set up between the first terminal installation and an intermediate installation, and a second link set up between the intermediate installation and the second terminal installation. A third link of the underlying path is set up between the intermediate installation and a third terminal installation. The method includes a step of configuring the third terminal installation, on completion of which the latter is able to process in reception a data stream transmitted through the virtual circuit.

10 Claims, 3 Drawing Sheets

(56) References Cited

OTHER PUBLICATIONS

Jounay (Ed) P Niger France Telecom Y Kamite NTT Communications L Martini Cisco S Delord UECOMM R Aggarwal Juniper Networks L Wang: "Requirements for Point-to-Multipoint Pseudowire; draft-jounay-pwe3-p2mp-pw-requirements-02.txt" Internet Engineering Task Force, IETF; Standard-working-draft, internet society (ISOC) 4, rue des Falaises CH—1205 Geneva, Switzerland, No. 2, Jul. 14, 2008, XP015059279.

Jounay P Niger France Telecom L Martini NTT Communications Y Kamite Cisco Delord G Heron UECOMM Tellabs L Wang R Aggarwal Teleno: "Use Cases and Signaling Requirements for Point-to-Multipoint PW: draft-jounay-pwe3-p2mp-pw-requirements-01. txt" IETF Standard-Working-Draft, Internet Engineering Task Force, IETF, CH, No. 1, Nov. 20, 2007, XP015054139.

English translation of the Written Opinion dated Jun. 7, 2011 from corresponding International Application No. PCT/FR2009/052296 filed on Nov. 25, 2009.

\* cited by examiner

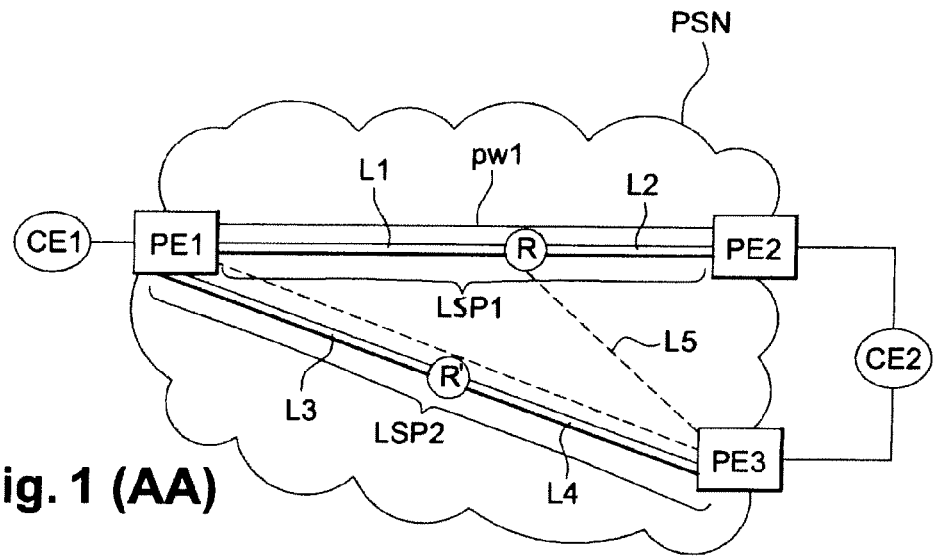
Fig. 1 (AA)
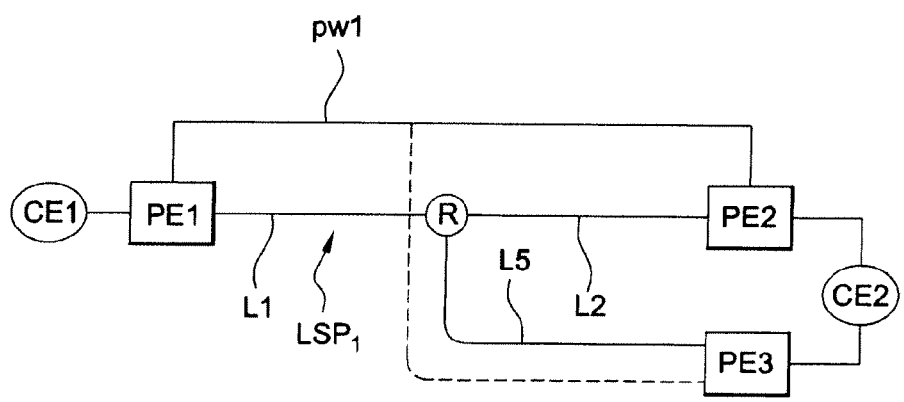
Fig. 2
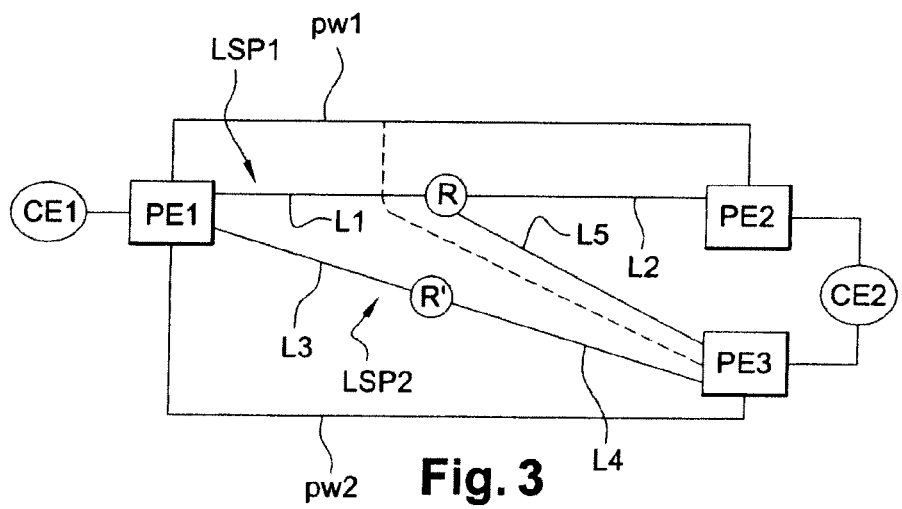
Fig. 3

VIRTUAL CIRCUIT CONFIGURATION METHOD

CROSS-REFERENCE TO RELATED APPLICATIONS

This Application is a Section 371 National Stage Application of International Application No. PCT/FR2009/052296, filed Nov. 25, 2009 and published as WO 2010/061133 on Jun. 3, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure lies in the field of telecommunications, and more particularly the field of packet switching networks.

BACKGROUND OF THE DISCLOSURE

In a packet switching network or Packet Switched Network, the data to be transmitted take the form of packets processed by installations of the network until reaching their destination. The set of packets to be transmitted constitutes a data stream.

An exemplary technology used in packet switching networks to convey data packets is the MPLS (MultiProtocol Label Switching) technology. The MPLS technology proposes that the header of the data packets be supplemented with one or more labels containing information allowing the installations of the network to determine the next hop that a packet must perform in order to reach its destination.

In such a network, the various installations of the network are connected together by means of MPLS paths called LSPs (Label Switched Paths).

An LSP path is set up from a head terminal installation (or Ingress installation), through intermediate installations and to a destination terminal installation (or Egress installation).

MPLS technology is described in greater detail in a document from the IETF (Internet standardization group, the abbreviation standing for Internet Engineering Task Force), referenced RFC 3031 (RFC standing for "Request For Comments").

However, MPLS technology allows only packets complying with the IP (Internet Protocol) protocol to be processed.

In order to alleviate this drawback, the PWE3 (Pseudo Wire Emulation Edge to Edge) standardization group of the IETF defines a concept of virtual circuit making it possible to emulate a bidirectional point-to-point link between two installations of a packet switching network relying on IP/MPLS technology. Virtual circuits such as these, defined in the document RFC 3985, allow the transmission of data packets not complying with the IP protocol, such as for example data packets complying with the ATM protocol.

With reference to FIG. 1, a virtual circuit pw1 is set up between a first terminal installation PE1 disposed at the boundary of a packet switching network PSN and a second terminal installation PE2 also disposed at the boundary of the network PSN. A virtual circuit pw1 such as this is carried by an underlying LSP path, $LSP_1$. An underlying path $LSP_1$ such as this comprises a first link L1 set up between the terminal installation PE1 and an intermediate installation R of the PSN network. A second link L2 of the underlying path $LSP_1$ is, for its part, set up between the intermediate installation R and the second terminal installation PE2. The first terminal installation PE1 constitutes at one and the same time a first end of the virtual circuit pw1 and of the underlying path $LSP_1$. The second terminal installation PE2 constitutes at one and the same time a second end of the virtual circuit pw1 and of the underlying path $LSP_1$. Once the virtual circuit pw1 has been set up, the terminal installation PE1 sends a data stream conveyed via the virtual circuit pw1 up to the terminal installation PE2.

In order to ensure continuity of service in the case of failure of the second link of the underlying path $LSP_1$, it is known to implement the protection solution which is the subject of patent document WO 2008/037917, filed in the name of the applicant so as to ensure the continuity of the traffic between a source installation CE1 connected to the first terminal installation PE1 and a receiver installation CE2 connected to the second terminal installation PE2.

Such a solution consists in setting up a third link L5 between the intermediate installation R and a third terminal installation PE3 to which the receiver installation CE2 is also connected. The third link L5 is set up at the same time as the other constituent links L1 and L2 of the underlying path $LSP_1$ on the initiative of the first terminal installation PE1.

Thus, when the intermediate installation R detects a failure of the second link L2 or of the second intermediate terminal PE2, it activates the third link L5 and shifts the data traffic onto the latter link.

Such a solution thus makes it possible to ensure continuity of service at the level of the underlying paths. However, such a solution does not make it possible to protect the virtual circuit pw1 in the case of failure of the second link of the underlying path. Indeed, a virtual circuit being a point-to-point link set up between a first terminal installation and a second terminal installation, a failure of the second link of the underlying path causes a break in the virtual circuit.

To alleviate this drawback, the PWE3 working group proposes a solution consisting in twinning the first virtual circuit pw1 with a second virtual circuit pw2 serving as backup virtual circuit so that, when the second link of the underlying path develops a fault the data packets are conveyed by means of the backup virtual circuit pw2, one end of which is constituted by a different output terminal installation.

Thus, with reference to FIG. 1, a second virtual circuit pw2 is set up between the terminal installation PE1, constituting a first end of the virtual circuit, and a second terminal installation PE3 constituting a second end of the virtual circuit. A virtual circuit pw2 such as this is carried by an underlying LSP path, $LSP_2$. An underlying path $LSP_2$ such as this comprises a first link L3 set up between the terminal installation PE1 and a second intermediate installation R' of the network PSN. A second link L4 of the underlying path $LSP_2$ is, for its part, set up between the intermediate installation R' and the third terminal installation PE3.

In order to ensure continuity of service, the input terminal installation PE1 comprises means implementing a function for detecting a fault of the second link of the underlying path $LSP_1$ or of the terminal installation PE2 and a function for shifting the data stream from the first virtual circuit pw1 to the second virtual circuit pw2.

When a failure occurs at the level of the second link of the underlying path $LSP_1$, it is detected at the level of the input terminal installation PE1, for example on the basis of a message, sent across the network PSN, indicating the occurrence of a failure. Once informed of the failure, the input terminal installation PE1 triggers the shifting of the data stream from the first virtual circuit pw1 to the second virtual circuit pw2 thus ensuring the conveying of the data to the output terminal installation PE3.

However, a consequence of such a solution is a lengthening of the restore time in the case of failure of an output terminal installation or of a constituent link of an underlying path, this having a negative impact on service quality.

SUMMARY

An illustrative embodiment of the invention relates to a method for configuring a virtual circuit set up between a first and a second terminal installation, the virtual circuit being carried by an underlying path comprising a first link set up between the first terminal installation and an intermediate installation, and a second link set up between the intermediate installation and the second terminal installation.

A third link of the underlying path being set up between the intermediate installation and a third terminal installation, the method comprises a step of configuring the third terminal installation, on completion of which the latter is able to process in reception a data stream transmitted through the virtual circuit.

More particularly, the method which is the subject of an embodiment of the invention comprises:

a step of receiving a configuration message comprising at least one parameter for identifying the virtual circuit by a third terminal installation connected by a third link of the underlying path to the intermediate installation, a step of configuring the third terminal installation by means of the parameter for identifying the virtual circuit, on completion of which the third terminal installation is able, in the case of failure of the second link, to process the data stream transmitted through the third link of the underlying path in the guise of data stream of the virtual circuit.

The solution which is the subject of an embodiment of the invention proposes to use another terminal installation belonging to a link of an underlying path to constitute the end of a virtual circuit carried by this underlying path. By configuring the third terminal installation so that it can process in reception the data stream transmitted through the virtual circuit, it becomes possible for the virtual circuit considered to be carried by the first and the third link of the underlying path, rather than by the latter's first and second link. The third terminal installation thus becomes an end of the first virtual circuit instead of the second terminal installation. This makes it possible for example to protect the virtual circuit when the second terminal installation is no longer accessible subsequent to the failure of the second link of the underlying path or of the second terminal installation or when the second terminal installation is used at the limit of its capabilities to offload it onto another terminal installation.

Such a solution has never been envisaged in the prior art. The person skilled in the art has indeed always considered a virtual circuit to be a point-to-point link set up between a first terminal installation and a second terminal installation, so that with each first terminal installation/second terminal installation pair, is associated a virtual circuit.

Running counter to these preconceptions of the person skilled in the art, the inventors of the present patent application propose, conversely, to modify this pair without, however, creating a new virtual circuit.

Such an embodiment makes it possible in particular to improve the restore time in the case of failure of the second link of the underlying path since the shifting of the virtual circuit occurs as near as possible to the failure. By improving the restore time, the quantity of data lost subsequent to the failure is also reduced.

Such a solution allows an improvement in the network reactivity since detection occurs as near as possible to the failure. Thus, the failure of the second link of the underlying path is detected more rapidly, the information not having to pass through the network as far as the first terminal installation before being processed. The virtual circuit shifting function being embedded in the intermediate installation, the shifting of the virtual circuit to the third link occurs more rapidly since shifting is triggered on detection of the failure by the intermediate installation.

The data broadcast in the virtual circuits may be useful data, such as for example an ATM stream transporting a service or else service data, such as for example a failure detection message relating to an installation of the network. Thus in the case of exchanges of service data, the solution proposed in the present patent application makes it possible to improve the reactivity of the installations present in the network.

According to a characteristic of the configuration method which is the subject of an embodiment of the invention, it comprises a step of reception by the third terminal installation of a request to configure the virtual circuit comprising at least one parameter for identifying the virtual circuit, in which the third terminal installation is configured by means of the virtual circuit identifying parameter.

The virtual circuit not being set up between the first and the third terminal installation, it is necessary to provide the latter with the virtual circuit identifying parameters that are necessary for its configuration.

The parameters identifying the virtual circuit are for example, an identifier of the underlying path by which it is carried, the label to be used during the broadcasting of the data through the virtual circuit, etc.

Advantageously, such parameters may be determined by the first terminal installation. Indeed, the first terminal installation constituting an end of the virtual circuit, it knows the parameters identifying the virtual circuit.

According to a characteristic of the configuration method which is the subject of an embodiment of the invention, the protection request also comprises a request to set up another virtual circuit, termed a backup virtual circuit, between the first and the third terminal installation, the backup virtual circuit being intended to transmit the data stream.

By making provision to set up a backup virtual circuit between the first and the third terminal installation, it is possible to propose a more solid virtual circuit protection solution. Indeed, in the case of failure of the second link of the underlying path, it becomes possible initially to shift the virtual circuit onto the third link of the underlying path, thus ensuring a relatively small restore time and then, subsequently it is possible to shift the data stream initially transmitted through the virtual circuit over to the backup virtual circuit.

An embodiment of the invention further relates to a terminal installation intended to form an end of a virtual circuit set up between a first and a second terminal installation, the virtual circuit being carried by an underlying path comprising a first link set up between the first terminal installation and an intermediate installation, and a second link set up between the intermediate installation and the second terminal installation.

A terminal installation such as this is intended to be connected by a third link of the underlying path to the intermediate installation, and comprises:

means for receiving a configuration message comprising at least one parameter for identifying the virtual circuit, means of configuration by means of the parameter for identifying the virtual circuit, on completion of which the terminal installation is able, in the case of failure of the second link, to process the data stream transmitted through the third link of the underlying path in the guise of data stream of the virtual circuit.

An embodiment of the invention also relates to a computer program, comprising program code instructions for the implementation of the steps of the configuration method according to an embodiment of the invention when the program is executed by a processor.

An embodiment of the invention relates finally to a method of generating a signal intended to be received by a terminal installation intended to form an end of a virtual circuit set up between a first and a second terminal installation, the virtual circuit being carried by an underlying path comprising a first link set up between the first terminal installation and an intermediate installation, and a second link set up between the intermediate installation and the second terminal installation.

Such a signal comprises at least one parameter for identifying the virtual circuit by means of which the terminal installation is configured to process the data stream transmitted through a third link of the underlying path, set up between the intermediate installation and the terminal installation, in the guise of data stream of the virtual circuit in the case of failure of the second link.

According to a feature of the signal which is the subject of an embodiment of the invention, the configuration data comprise at least one virtual circuit identifying parameter.

According to another feature of the signal which is the subject of an embodiment of the invention, the virtual circuit identifying parameters comprise:

an identifier of the virtual circuit an identifier of the underlying path carrying the virtual circuit, a label.

According to a feature of the signal which is the subject of an embodiment of the invention, said signal furthermore comprises a request to set up another virtual circuit between the first and the third terminal installation.

BRIEF DESCRIPTION OF THE DRAWINGS

Other characteristics and advantages will become apparent on reading embodiments described with reference to the drawings in which:

FIG. 1 represents a solution implemented in the state of the art so as to ensure continuity of service in a packet switching network, FIG. 2 represents a first solution making it possible to ensure continuity of service in the case of failure of an underlying path carrying a virtual circuit according to an embodiment of the invention, FIG. 3 represents a second solution making it possible to ensure continuity of service in the case of failure of an underlying path carrying a virtual circuit according to an embodiment of the invention.

DETAILED DESCRIPTION OF ILLUSTRATIVE EMBODIMENTS

Figure 4:
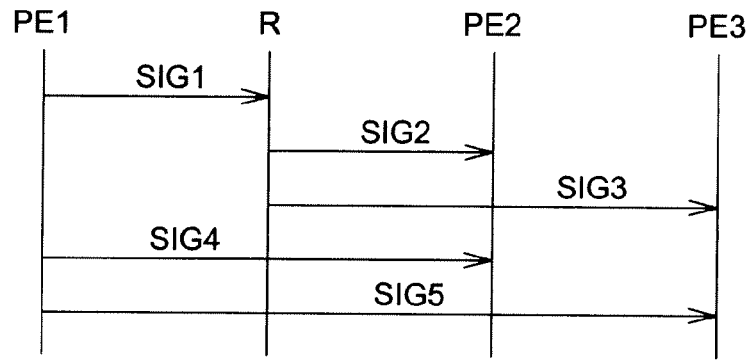
FIG. 4 represents a timechart of exchanges of messages between a first terminal installation and an intermediate installation belonging to a packet switching network on the one hand and the intermediate installation and a second and a third terminal installation on the other hand, so as to set up an underlying path and a virtual circuit in accordance with the configuration method which is the subject of an embodiment of the invention.

FIG. 2 represents a connection set up between a first terminal installation PE1 and two terminal installations PE2 and PE3, each of these three terminal installations being disposed at the boundary of a packet switching network PSN. These three terminal installations are connected together by underlying paths $LSP_i$ set up in accordance with the RSVP (Resource Reservation Protocol) protocol. An underlying path $LSP_1$ is set up between the first terminal installation PE1 and the second terminal installation PE2. An underlying path such as this comprises a first link L1 set up between the first terminal installation PE1 and an intermediate installation R and a second link L2 set up between the intermediate installation R and the second terminal installation PE2.

A single-segment virtual circuit pw1 setting up a connection between the first terminal installation PE1 and the second terminal installation PE2 is carried by the underlying path $LSP_1$. The virtual circuit pw1 thus set up makes it possible to broadcast streams of data sliced up into data packets between a first network installation CE1, termed the source installation, connected to the first terminal installation PE1 and a second network installation CE2, termed the receiver installation, connected to the second terminal installation PE2.

In the case of failure of the constituent link L2 of the underlying path $LSP_1$ it is known to implement the protection solution which is the subject of patent document WO 2008/037917, filed in the name of the applicant so as to ensure continuity of the traffic between the source installation CE1 and the receiver installation CE2 at the level of the underlying paths. Hereinafter in the text, the expression failure of the second link L2 is understood to mean either a failure of the link L2 itself or equally a failure of the second terminal installation PE2.

Such a solution consists in setting up a third link L5 of the underlying path $LSP_1$ between the intermediate installation R and the third terminal installation PE3 to which the receiver installation CE2 is also connected. The third link L5 is set up at the same time as the other constituent links L1 and L2 of the underlying path $LSP_1$ on the initiative of the first terminal installation PE1.

Thus, when the intermediate installation R detects a failure of the second link L2, it activates the third link L5 and shifts the data stream onto the latter link. The virtual circuit pw1 being carried by the underlying path LSP1, when the data stream is shifted onto the third link L5, the virtual circuit pw1 is likewise shifted onto the link L5 and its end is now the third terminal installation PE3 rather than the second terminal installation PE2.

FIG. 3 represents a second embodiment of the invention. The common elements described with reference to FIG. 2 bear the same references and will not be described again.

In this second embodiment, a connection is set up between the first terminal installation PE1 and the two terminal installations PE2 and PE3. These three terminal installations are connected together by underlying paths $LSP_i$. The underlying path $LSP_1$ is set up between the first terminal installation PE1 and the second terminal installation PE2. An underlying path $LSP_2$ is set up between the first terminal installation PE1 and the third terminal installation PE3. An underlying path such as this comprises a first link L3 set up between the first terminal installation PE1 and an intermediate installation R' and a second link L4 set up between the intermediate installation R' and the third terminal installation PE3.

A single-segment virtual circuit pw2 setting up a connection between the first terminal installation PE1 and the third terminal installation PE3 is carried by the underlying path $LSP_2$. The virtual circuit pw2 thus set up serves as backup virtual circuit in the case of failure of the underlying path $PLS_1$ carrying the virtual circuit pw1.

In this second embodiment, in the case of failure of the constituent link L2 of the underlying path $LSP_1$, the data stream shifts initially onto the link L5 of the underlying path $LSP_1$. Then, subsequently, the data stream is shifted onto the backup virtual circuit pw2.

FIG. 4 represents a timechart of the exchanging of messages between the terminal installation PE1, the intermediate installation R and the terminal installations PE2 and PE3 in accordance with the first embodiment of the invention.

In accordance with an embodiment of the invention, the setting up of the underlying path $LSP_1$ and of the virtual circuit pw1 is on the initiative of the first terminal installation PE1 and relies on the exchanging of setup messages in accordance with the T-LDP protocol for the virtual circuit (Label Distribution Protocol) and with the RSVP-TE protocol for the LSP. Thus, a first setup message SIG1 for a first link L1 of the underlying path $LSP_1$ is sent by the first terminal installation PE1 destined for the intermediate installation R. This first setup message comprises an identifier of the second terminal installation PE2, an identifier of the third terminal installation PE3, as well as a field comprising a request to set up a backup link L5 between the intermediate installation R and the third terminal installation PE3 identified in the message SIG1.

On receipt of the first setup message SIG1, the intermediate installation R completes a switching table TC on the basis of the information contained in the message SIG1. Once the switching table TC has been completed, the intermediate installation R sends two setup messages SIG2 and SIG3. The setup message SIG2 for the link L3 is sent to the second terminal installation PE2, and the setup message SIG3 for the link L5 is sent to the third terminal installation PE3. Such messages comply with the setup messages conventionally sent to set up a link of an underlying path between two installations belonging to a packet switching network.

Once all the links of the underlying path $LSP_1$ have been set up, the first terminal installation PE1 sends a setup message SIG4 for a virtual circuit destined for the second terminal installation PE2.

Figure 8A:
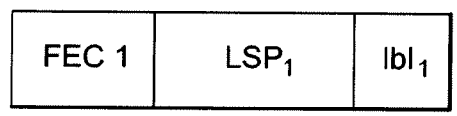
FIGS. 8A, 8B and 8C represent messages exchanged during the implementation of an embodiment of the invention.

Such a setup message SIG4 for a virtual circuit pw1 comprises an identifier FEC1 of the virtual circuit pw1 as well as a field comprising an identifier of the underlying path $LSP_1$ carrying the virtual circuit pw1. Such a setup message SIG4 is represented in FIG. 8A.

In a particular embodiment of the invention, the identifier FEC1 of the virtual circuit pw1 comprises an identifier SAII1 of the first terminal installation PE1, and an identifier TAII2 of the second terminal installation PE2.

The identifier FEC1 of the virtual circuit constitutes an FEC (Forwarding Equivalent Class) identifying the virtual circuit.

The setup message SIG4 is distinguished from a conventional setup message for a virtual circuit since it comprises additional data such as the identifier of the underlying path carrying the virtual circuit.

The setup message SIG4 also comprises a label lbl1 added by the first terminal installation PE1 to each data packet intended to be sent to the second terminal installation PE2.

Finally, the first terminal installation PE1 sends a configuration message SIG5 destined for the third terminal installation PE3.

Figure 8B:
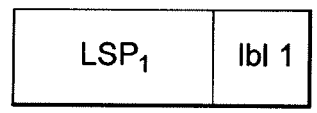

Such a configuration message SIG5 comprises an identifier of the virtual circuit, as well as a field comprising an identifier of the underlying path $LSP_1$ carrying the virtual circuit pw1, as well as the label lbl1. Such a message is represented in FIG. 8B. On the strength of this information, the third terminal installation PE3 completes a switching table TC'. Once the switching table TC' has been completed, the terminal installation PE3 is able to process data packets transmitted through the virtual circuit pw1 when the latter is shifted onto the third terminal installation PE3.

When setting up a virtual circuit, the label added by the first terminal installation PE1 to each data packet intended to be sent to the second terminal installation PE2 is generally determined by the terminal installation PE2. According to one aspect of an embodiment of the invention, the label lbl1 is determined by the first terminal installation PE1 in contradistinction to current practice so as to be able to transmit the same value of this label to the third terminal installation PE3 so that the latter can configure its switching table.

Once the virtual circuit pw1 has been set up, data streams are broadcast between the first terminal installation PE1 and the second terminal installation PE2.

Figure 5:
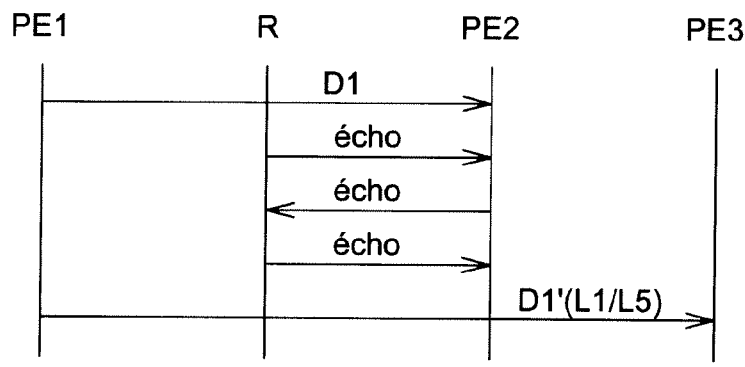
FIG. 5 represents a timechart of exchanges of messages between a first terminal installation and an intermediate installation belonging to a packet switching network on the one hand and the input installation and a second and a third terminal installation on the other hand, during the broadcasting of data through the virtual circuit according to a first embodiment of the invention.

FIG. 5 represents a timechart of the exchanging of messages between the first terminal installation PE1, the intermediate installation R, the second terminal installation PE2 and the third terminal installation PE3 during the broadcasting of data streams, in a first variant embodiment of the invention.

A data stream D1 is sent by the first terminal installation PE1 destined for the second terminal installation PE2. This data stream is broadcast through the virtual circuit pw1.

In order to ensure continuity of service, the intermediate installation R comprises a function for detecting a failure of the link L2 of the underlying path $LSP_1$ or of the second terminal installation PE2. In order to detect such a failure, the intermediate installation R regularly exchanges "echo" messages with the second terminal installation PE2.

When the intermediate installation R does not receive any response to an "echo" message, it deduces therefrom that the second terminal installation PE2 or the link L2 has failed.

The intermediate installation R then shifts the traffic onto the link L5 so as to ensure continuity of service. The virtual circuit pw1 is then carried by the links L1 and L5 of the underlying path $LSP_1$.

A data stream D1' sent, through the virtual circuit pw1, by the first terminal installation PE1 is then received by the third terminal installation PE3.

Figure 6:
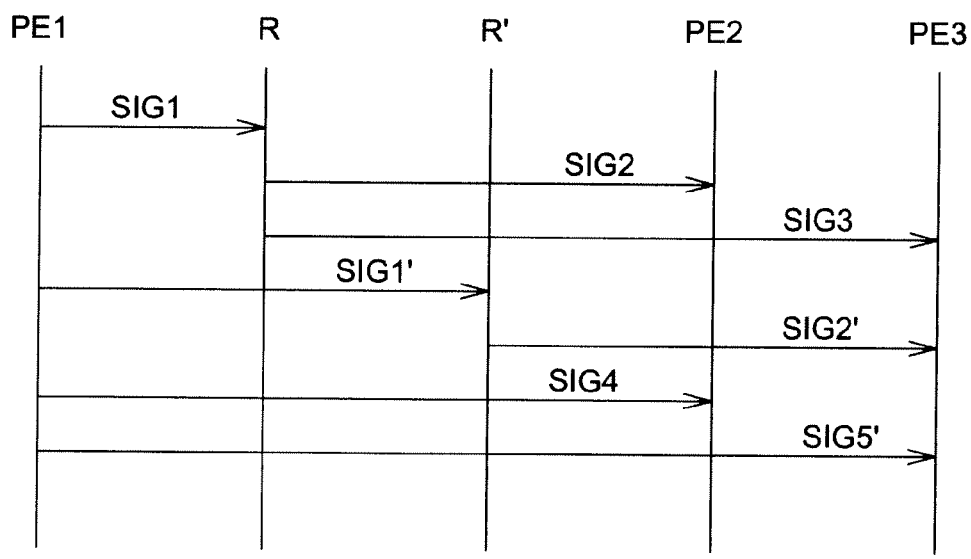
FIG. 6 represents a timechart of exchanges of messages between a first terminal installation, a first and a second intermediate installation belonging to a packet switching network on the one hand and the intermediate installations and a second and a third terminal installation on the other hand, so as to set up an underlying path and two virtual circuits in accordance with a second embodiment of the invention.

FIG. 6 represents a timechart of the exchanging of messages between the terminal installation PE1, a first intermediate installation R, a second intermediate installation R' and the terminal installations PE2 and PE3 in accordance with the second embodiment of the invention.

In accordance with an embodiment of the invention, the setting up of the underlying paths $LSP_1$, $LSP_2$ and of the virtual circuits pw1 and pw2 is on the initiative of the first terminal installation PE1 and relies on the exchanging of setup messages between the various installations involved.

Thus, a first setup message SIG1 for a first link L1 of an underlying path is sent by the first terminal installation PE1 destined for the intermediate installation R. This first setup message comprises an identifier of the second terminal installation PE2, an identifier of the third terminal installation PE3, as well as a field comprising a request to set up a backup underlying path between the intermediate installation R and the third terminal installation identified in the message SIG1.

On receipt of the first setup message SIG1, the intermediate installation R completes a switching table TC on the basis of the information contained in the message SIG1. Once the switching table TC has been completed, the intermediate installation R sends two setup messages SIG2 and SIG3. The setup message SIG2 for the link L2 of the underlying path $LSP_1$ is sent to the second terminal installation PE2, and the setup message SIG3 for the link L5 of the underlying path $LSP_1$ is sent to the third terminal installation PE3.

Once all the links of the underlying path $LSP_1$ have been set up, the first terminal installation PE1 sends a second setup message SIG1' for a first link L3 of the underlying path $LSP_2$ destined for the intermediate installation R'.

On receipt of the setup message SIG1', the intermediate installation R' completes a switching table TC'' on the basis of the information contained in the message SIG1'. Once the switching table TC'' has been completed, the intermediate installation R' sends a setup message SIG2' for the link L4 destined for the third terminal installation PE3 thus setting up the second underlying path $LSP_2$.

In a particular embodiment of the invention, the underlying paths $LSP_1$ and $LSP_2$ may be set up simultaneously.

Once the underlying paths $LSP_i$ have been set up, the first terminal installation PE1 sends a setup message SIG4 for a virtual circuit pw1 destined for the second terminal installation PE2.

Such a setup message SIG4 is identical to the message SIG4 described with reference to FIGS. 4 and 8A.

The setup message SIG4 also comprises a label lbl1 used by the first terminal installation PE1 of the broadcasting of data streams destined for the second terminal installation PE2 through the virtual circuit pw1. This label is determined and added by the first terminal installation PE1 to each data packet intended to be sent to the second terminal installation PE2.

Finally, the first terminal installation PE1 sends a setup message SIG5' for a virtual circuit pw2, termed a backup virtual circuit destined for the third terminal installation PE3.

Figure 8C:
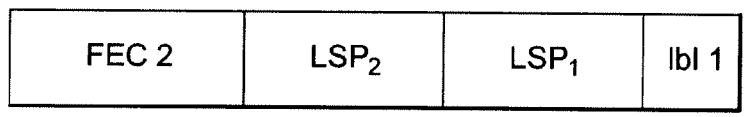

Such a message SIG5' comprises an identifier FEC2 of the backup virtual circuit pw2, a first field comprising an identifier of the underlying path $LSP_2$ carrying the backup virtual circuit pw2 as well as a second field comprising an identifier of the underlying path $LSP_1$ carrying the virtual circuit pw1. Such a setup message SIG5' is represented in FIG. 8C.

The setup message SIG5' is distinguished from a conventional setup message for a virtual circuit since it comprises additional data such as the identifier of the underlying path carrying the virtual circuit pw1 and the identifier of the underlying path carrying the backup virtual circuit pw2.

The message SIG5' also comprises the label lbl1 determined by the first terminal installation PE1. On the strength of this information, the third terminal installation PE3 completes a switching table TC'. Once the switching table TC' has been completed, the terminal installation PE3 is able to process either data packets transmitted through the virtual circuit pw1 when the latter is shifted onto the third terminal installation PE3 or equally data packets transmitted through the backup virtual circuit pw2. Indeed, the various data packets received by the third terminal installation PE3 all comprising the same label lbl1 regardless of the virtual circuit through which they have been transmitted the third terminal installation PE3 does not distinguish the data packets transmitted through the virtual circuit pw1 from those transmitted through the backup virtual circuit pw2. In both cases the third terminal installation considers that it is dealing with data packets transmitted through the virtual circuit pw2.

Figure 7:
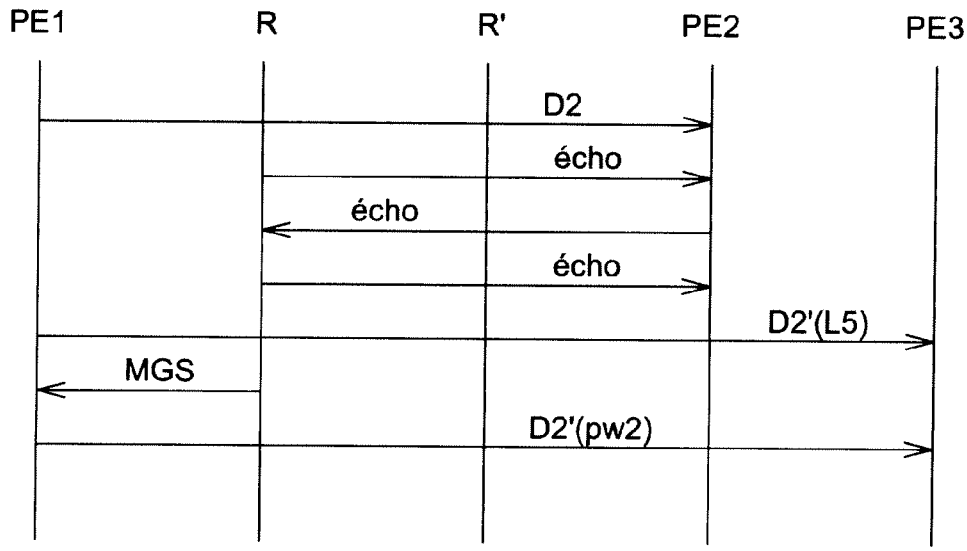
FIG. 7 represents a timechart of exchanges of messages between a first terminal installation and a first and a second intermediate installation belonging to a packet switching network on the one hand and the input installation and a second and a third terminal installation on the other hand, during the broadcasting of data through the virtual circuit according to a second embodiment of the invention.

FIG. 7 represents a timechart of the exchanging of messages between the first terminal installation PE1, the first intermediate installation R, the second intermediate installation R', the second terminal installation PE2 and the third terminal installation PE3 during the broadcasting of data streams, in the second variant embodiment of the invention.

A data stream D2 is sent by the first terminal installation PE1 destined for the second terminal installation PE2. This data stream is broadcast through the virtual circuit pw1.

In order to ensure continuity of service, the intermediate installation R comprises a function for detecting a failure of the link L2 of the underlying path $LSP_1$ or of the second terminal installation PE2. In order to detect such a failure, the intermediate installation R regularly exchanges "echo" messages with the second terminal installation PE2.

When the intermediate installation R does not receive any response to an "echo" message, it deduces therefrom that the second terminal installation PE2 or the link L2 has failed.

The intermediate installation R then shifts the traffic onto the link L5 so as to ensure continuity of service. The virtual circuit pw1 is then carried by the links L1 and L5 of the underlying path $LSP_1$.

A data stream D2' sent, through the virtual circuit pw1, by the first terminal installation PE1 is then received by the third terminal installation PE3.

The intermediate installation R thereafter sends a shift message MGS destined for the first terminal installation PE1. On receipt of this message MGS, the first terminal installation shifts the data stream D2' from the virtual circuit pw1 to the backup virtual circuit pw2. The virtual circuit pw1 is then no longer used.

In another embodiment of the invention, the first terminal installation PE1 also comprises a function for detecting a failure of the link L2 of the underlying path $LSP_1$ or of the second terminal installation PE2.

When the first terminal installation PE1 detects the failure, it shifts the data stream onto the backup virtual circuit pw2.

The failure of the link L2 is detected in two stages. Initially, the failure is detected at the level of the underlying path by the intermediate installation R and subsequently the failure is detected at the level of the virtual circuit by the first terminal installation PE1.

Figure 9:
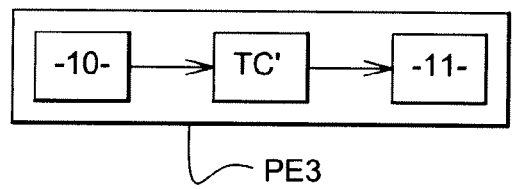
FIG. 9 represents a terminal installation implementing the configuration method which is the subject of an embodiment of the invention.

A terminal installation PE3 is represented in FIG. 9. A terminal installation PE3 such as this comprises means 10 for receiving configuration messages SIG5, setup messages SIG5' for a virtual circuit, setup messages SIG3 and SIG2' for links of underlying paths, and data packets transmitted through the virtual circuits pw1 and pw2.

Such reception means 10 are connected to a switching table TC' completed with the aid of the information included in the various messages received by the terminal installation PE3.

The terminal installation PE3 finally comprises means 11 for processing the data packets received. Such processing means are for example means for sending the data packets to the receiver installation CE2.

Finally, the subject of an embodiment of the invention relates to a computer program, in particular a computer program on or in an information medium or memory, suitable for implementing an embodiment of the invention. This program can use any programming language, and be in the form of source code, object code, or of code intermediate between source code and object code such as in a partially compiled form, or in any other desirable form for implementing the configuration method according to an embodiment of the invention.

The information medium may be any non-transitory entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium may be a transmissible medium such as an electrical or optical signal, which may be conveyed via an electrical or optical cable, by radio or by other means. The program according to an embodiment of the invention may in particular be downloaded from a network of Internet type.

Although the present disclosure has been described with reference to one or more examples, workers skilled in the art will recognize that changes may be made in form and detail without departing from the scope of the disclosure and/or the appended claims.

The invention claimed is:

1. A method for configuring a virtual circuit set up between a first and a second terminal installation through which a data stream is intended to be transmitted, the virtual circuit being carried by an underlying path comprising a first link set up between the first terminal installation and an intermediate installation, a second link set up between the intermediate installation and the second terminal installation, and a third link set up between the intermediate installation and a third terminal installation, wherein the method comprises:
   a step of receiving a configuration message by the third terminal installation, said message comprising at least the following parameters: an identifying parameter for the virtual circuit,
   an identifying parameter for the underlying path carrying the virtual circuit, and a label determined by the first terminal installation, identifying the data stream;
   a step of configuring a switching table of the third terminal installation by using said parameters, and
   a step of processing the data stream by using the configured switching table, when the virtual circuit is switched from the second link to the third link following the detection of a fault on the second link.

2. The method as claimed in claim 1, in which the configuration message also comprises a request to set up another virtual circuit, termed a backup virtual circuit, between the first and the third terminal installations, the backup virtual circuit being configured to transmit the data stream.

3. A terminal installation intended to form an end of a virtual circuit set up between a first and a second terminal installation through which a data stream is intended to be transmitted, the virtual circuit being carried by an underlying path comprising a first link set up between the first terminal installation and an intermediate installation, a second link set up between the intermediate installation and the second terminal installation, and a third link set up between the intermediate installation and the terminal installation,
   wherein the terminal installation comprises:
       means for receiving a configuration message comprising at least the following parameters: an identifying parameter for the virtual circuit, an identifying parameter for the underlying path carrying the virtual circuit, and a label determined by the first terminal installation, identifying the data stream;
       means for configuring a switching table of the terminal installation by using said parameters; and
       means for processing the data stream by using the configured switching table, when the virtual circuit is switched from the second link to the third link following the detection of a fault on the second link.

4. A non-transitory storage medium comprising a computer program stored thereon, wherein the computer program comprises program code instructions for implementation of a method for configuring a virtual circuit set up between a first and a second terminal installation through which a data stream is intended to be transmitted, when the program is executed by a processor, wherein the virtual circuit is carried by an underlying path comprising a first link set up between the first terminal installation and an intermediate installation, a second link set up between the intermediate installation and the second terminal installation, and a third link set up between the intermediate installation and a third terminal installation, and wherein the method comprises:
   a step of receiving a configuration message by the third terminal installation, said message comprising at least the following parameters: an identifying parameter for the virtual circuit, an identifying parameter for the underlying path carrying the virtual circuit, and a label determined by the first terminal installation, identifying the data stream;
   a step of configuring a switching table of the third terminal installation by using said parameters; and
   a step of processing the data stream by using the configured switching table, when the virtual circuit is switched from the second link to the third link following the detection of a fault on the second link.

5. A method comprising:
   generating a signal by a first terminal installation, the signal carrying a configuration message for a virtual circuit intended to be received by a terminal installation able to form an end of a virtual circuit set up between the first and a second terminal installation through which a data stream is intended to be transmitted, the virtual circuit being carried by an underlying path comprising a first link set up between the first terminal installation and an intermediate installation, a second link set up between the intermediate installation and the second terminal installation, and a third link set up between the intermediate installation and the terminal installation wherein the signal comprises at least the following parameters: an identifying parameter for the virtual circuit, an identifying parameter for the underlying path carrying the virtual circuit, and a label determined by the first terminal installation, identifying the data stream;

sending the signal carrying the configuration message to the terminal installation, said terminal installation comprising means for configuring a switching table by using said parameters, and processing the data stream by using the configured switching table, when the virtual circuit is switched from the second link to the third link following the detection of a fault on the second link.

6. The method as claimed in claim 5, wherein the signal furthermore comprises a request to set up another virtual circuit between the first terminal installation and the said terminal installation.

7. The method of claim 1, wherein the virtual circuit is a pseudowire.

8. The terminal installation of claim 3, wherein the virtual circuit is a pseudowire.

9. The non-transitory storage medium of claim 4, wherein the virtual circuit is a pseudowire.

10. The method of claim 5, wherein the virtual circuit is a pseudowire.

\* \* \* \* \*

UNITED STATES PATENT AND TRADEMARK OFFICE
CERTIFICATE OF CORRECTION

PATENT NO.        : 8,599,680 B2                                         Page 1 of 1
APPLICATION NO.   : 13/131497
DATED             : December 3, 2013
INVENTOR(S)       : Jounay et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 84 days.

Signed and Sealed this
Twenty-second Day of September, 2015

Michelle K. Lee
*Director of the United States Patent and Trademark Office*